United States Patent [19]
Barakat et al.

[11] Patent Number: 6,118,835
[45] Date of Patent: Sep. 12, 2000

[54] APPARATUS AND METHOD OF SYNCHRONIZING TWO LOGIC BLOCKS OPERATING AT DIFFERENT RATES

[75] Inventors: Edmond H. Barakat; Anthony Botzas, both of Allentown, Pa.

[73] Assignee: Lucent Technologies, Inc., Murray Hill, N.J.

[21] Appl. No.: 08/924,807

[22] Filed: Sep. 5, 1997

[51] Int. Cl.[7] .................................................... H04L 7/00
[52] U.S. Cl. ........................................... 375/372; 375/377
[58] Field of Search .................................... 375/372, 377, 375/371; 348/441, 581

[56] References Cited

U.S. PATENT DOCUMENTS

| | | | |
|---|---|---|---|
| 5,229,852 | 7/1993 | Maietta et al. | 348/441 |
| 5,229,855 | 7/1993 | Sainn | 348/588 |
| 5,268,750 | 12/1993 | Stec et al. | 348/424 |
| 5,528,301 | 6/1996 | Hau et al. | 348/441 |
| 5,557,302 | 9/1996 | Levinthal et al. | 345/509 |
| 5,606,612 | 2/1997 | Griffin et al. | 380/14 |
| 5,623,512 | 4/1997 | Sasaki | 375/377 |
| 5,668,841 | 9/1997 | Haskell et al. | 375/371 |
| 5,850,572 | 12/1998 | Dierke | 395/873 |

*Primary Examiner*—Tesfaldet Bocure

[57] ABSTRACT

An apparatus and method employs a First In, First Out (FIFO) buffer to separate a first logic block operating at a first rate, such as 33.75 MHz, from a second logic block operating at a second rate, such as 27 MHz, which is lower than the first rate. The dual port FIFO operates with asynchronous Read and Write ports, and the Write port controls the input of data from the first logic block at the first rate to the FIFO. The FIFO provides a value indicating that the FIFO is full. Enablement of the Read port is based upon the presence of data in the FIFO and a synchronization signal for the data. Once enabled, the data is transferred from the FIFO to the second logic block at the second rate. A flag value of the FIFO is set when the FIFO buffer is full, and is used by the first logic block to interrupt data transfer into the FIFO at the first rate to allow data provided at the FIFO output at the second rate to empty the FIFO buffer.

8 Claims, 5 Drawing Sheets

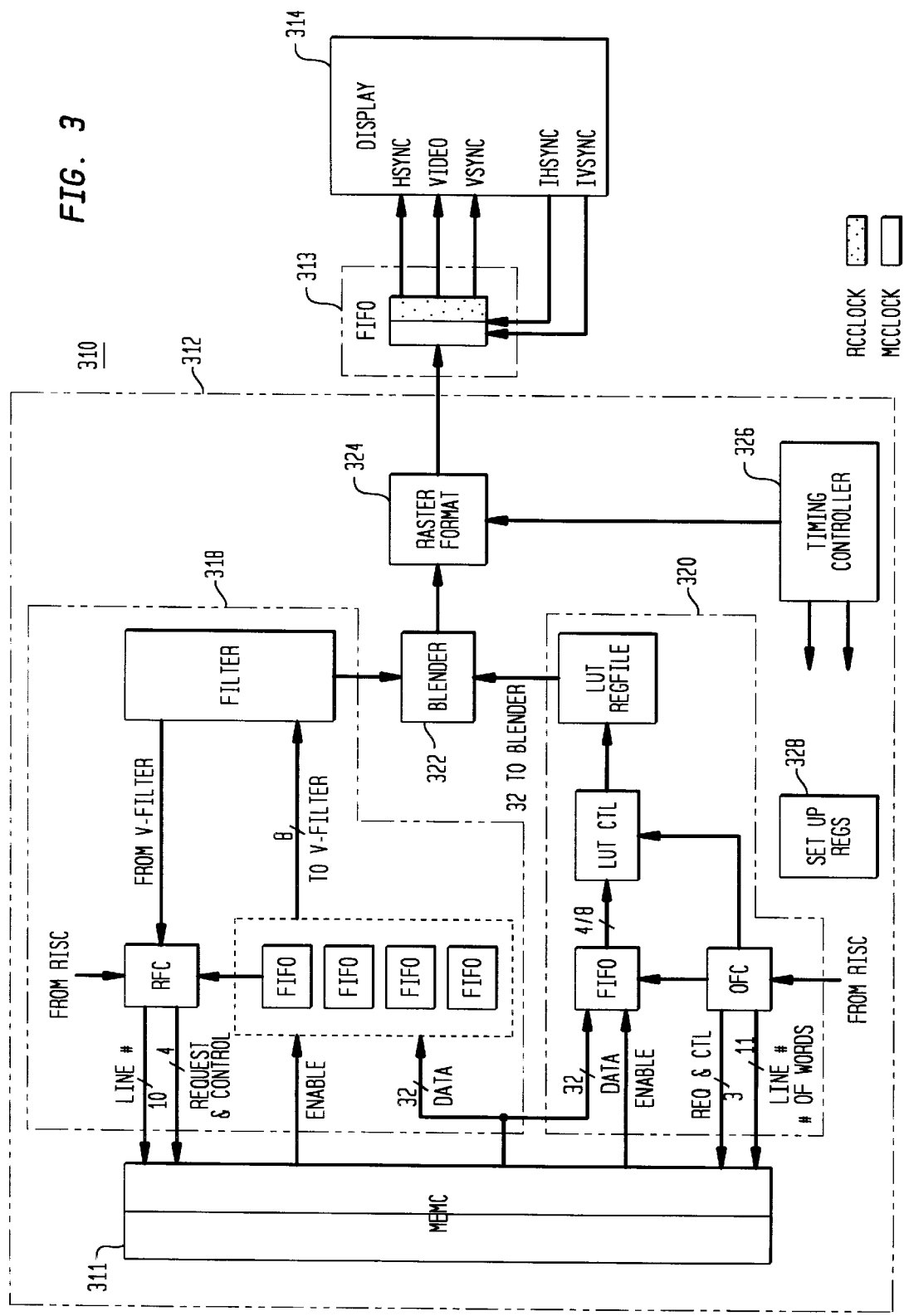

APPARATUS AND METHOD OF SYNCHRONIZING TWO LOGIC BLOCKS OPERATING AT DIFFERENT RATES

FIELD OF THE INVENTION

The present invention relates generally to synchronization of logic blocks and, more particularly, to improvements for synchronizing two logic blocks operating at different clock rates.

BACKGROUND OF THE INVENTION

Transfer of large numbers of signals from a first logic block operating at a first rate to a second logic block operating at a second rate is presently limited by employing a form of synchronizing delay inserted between the logic blocks for each signal. Although the use of Large Scale Integration (LSI) and Very Large Scale Integration (VLSI) allows millions of logic circuits to be implemented within a small area within a silicon wafer, inserting large numbers of synchronizing delays consumes power, reduces the available circuit area on a wafer, and creates problems associated with timing and layout of the signals between the logic blocks. Further, increasing the amount of logic increases the amount of error reports generated during the design phase of the integrated circuit.

By way of example, the aforementioned problem is encountered with the implementation of video decoders and video on-screen display devices which typically process encoded video signals in the 33.75 MHz clock domain, but must format and supply digital video signals to display devices in the 27 MHz clock domain according to, for example, an NTSC standard. For these systems, the clock rates of the first and second logic blocks differ by no more than the frequency of the lower one of the two clock rates. Synchronizing delays are typically implemented by double latching each data signal provided from the first logic block with a first clock rate with a clock signal from the receiving logic block having a second clock rate.

FIG. 1 is a block diagram illustrating two interconnected logic blocks operating with different rates in a video decoder 110 of the prior art. Referring to FIG. 1, the video decoder includes a memory controller 111 which provides stored decoded digital video data for display. As shown, the memory controller 111 includes a high speed memory processing and storage unit 112 (shown as shaded section) which may operate at a 33.75 MHz rate, and a display interface 113 which controls the transfer of display information from memory to a display formatting section 114. The display interface 113 operates at a different rate, such as 27 MHz. As shown, the logic within the display formatting section also operates in the 27 MHz domain; consequently, each of the data signals transferred from the high speed memory processing and storage unit 112 at the higher data rate must be re-clocked and synchronized to a lower data rate. Similarly, data signals transferred from the lower data rate to the higher data rate must also be re-clocked and synchronized. In addition, set up registers 115 used by the memory controller 111 must include logic operating at both data rates. Once the data is processed and formatted as display data, it is provided to an external display device 314.

FIG. 2A is a block diagram illustrating a dual flip-flop configuration of the prior art employed to synchronize signals transferred between a first logic block operating at a first rate and a second logic block operating at a second rate. The configuration of FIG. 2A is used to transfer data having the lower rate to the logic operating at the higher rate. The synchronizing delay includes a first flip-flop 201 and second flip-flop 202. The data signal at the first rate to be transferred is provided to the first flip-flop 201, and the data value(s) latched into flip-flop 201 by a clock signal of the receiving block clock (not shown) at the second rate. These data values latched in flip-flop 201 are provided to and latched into the second flip-flop 202 by a second clock pulse at the second rate while the next data value is latched into the first flip flop 201. Consequently, two data values, which may be eight bit values, corresponding to a high and low byte, are buffered and available to the receiving block.

The configuration of FIG. 2A may also be used to transfer data having a higher rate to the logic operating at the lower rate, but the data at the higher rate must first be slowed down to a rate slower than the lower rate clock. Consequently, the clock rate of the data to be transferred is first divided by two before being provided to the first flip-flop 201.

FIG. 2B is a timing diagram illustrating the synchronization of a lower rate data signal having clock CLK2 including data values D1L and D2L provided to a higher rate logic block according to a double latching synchronizing delay of the prior art. The output data values D1H and D2H of the second flip flop of FIG. 2A are synchronized with the higher rate clock signal of the second logic block CLK1. However, because of the large number of different data signals which are transferred to and from the memory controller 111, many such synchronizing delays are required.

As is apparent from the above, there is a continuing need for an efficient and cost-effective method and system to synchronize large groups of signals transferred from a first logic block operating at a first rate to a second logic block operating at a second rate.

SUMMARY OF THE INVENTION

The aforementioned deficiencies are addressed, and an advance is made in the art, by an apparatus for, and method of, synchronizing transfer of data values between a first logic block having a first data transfer rate and a second logic block having a second data transfer rate in which the data values include a sequence of values and a control value associated with the sequence. The apparatus and method include a first-in, first-out (FIFO) buffer adapted to receive the data values at the first data transfer rate when a write signal is present, and the FIFO provides a hold signal when a predetermined number of the data values are received. Also, the FIFO is adapted to provide the data values at the second transfer rate when a read signal is present. The apparatus and method also includes a process of providing the write signal in response to a presence of the control value when the hold signal is not present; and a process of detecting that the FIFO received at least one of the sequence of values and providing the read signal in response to the detection of the one of the sequence and the presence of the control value.

BRIEF DESCRIPTION OF THE DRAWINGS

The aforementioned features and benefits of the invention will be better understood from a consideration of the detailed description which follows taken in conjunction with the accompanying drawings, in which:

FIG. 3 is a block diagram illustrating an exemplary implementation of a video decoder in which a first logic block operating at a first rate is separated from a second logic block operating at a second rate by employing an exemplary embodiment of logic block synchronization according to the present invention;

Figure 1:
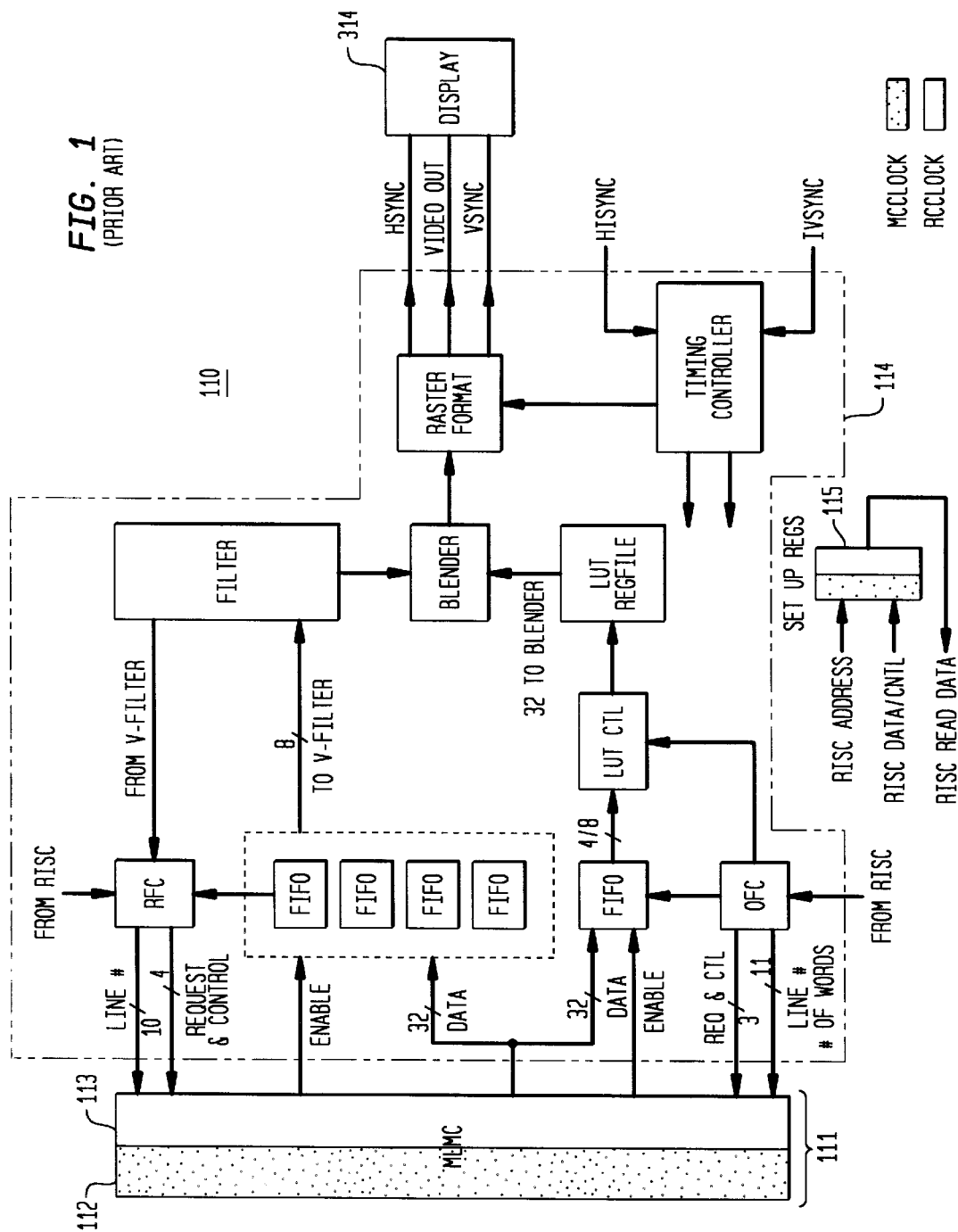
FIG. 1 is a block diagram illustrating two interconnected logic blocks operating with different rates in a video decoder of the prior art.
Figure 2A:
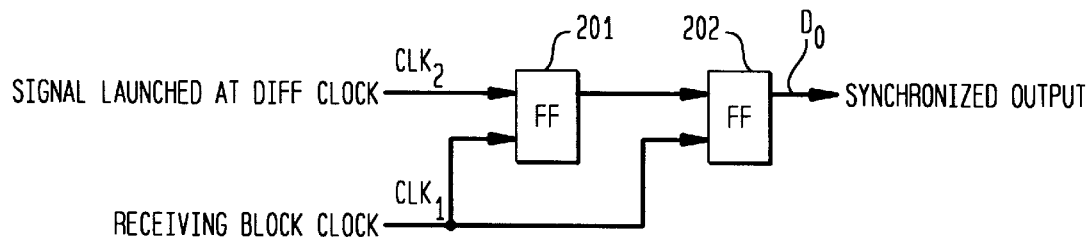
FIG. 2A is a block diagram illustrating a dual flip-flop configuration of the prior art employed to synchronize signals transferred between a first logic block operating at a first rate and a second logic block operating at the second rate.
Figure 2B:
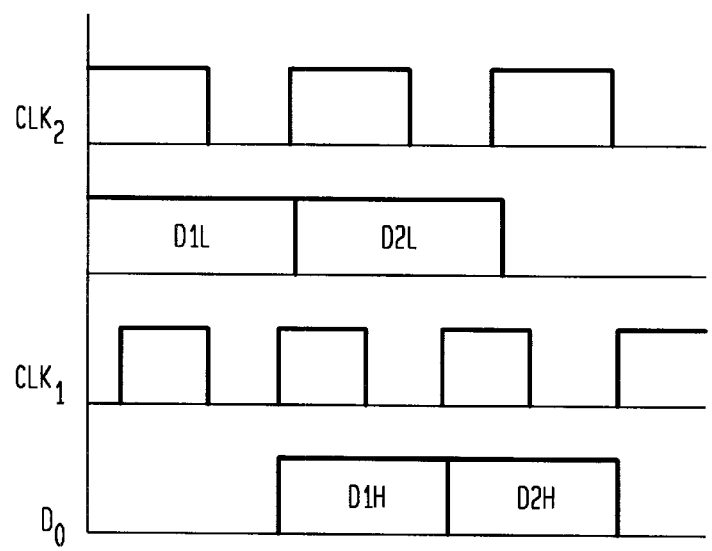
FIG. 2B is a timing diagram illustrating the synchronization of a lower rate data signal provided to a higher rate logic block according to a double latching synchronizing delay of the prior art.

DETAILED DESCRIPTION
System Overview

According to the present invention, a first logic block having a first clock rate, such as 33.75 MHz, is separated from a second logic block having a second clock rate, such as 27 MHz, by a logic buffer which synchronizes the signals provided between the first and second logic blocks. For the present invention, rather than synchronize many data signals between one or more functions, such as between memory storage, processing and formatting functions, synchronization is accomplished between the formatted output signals and the output device. Processing is accomplished at one common rate, and the desired output data is synchronized to the second rate and provided as needed to the output device. Further synchronization of data may be made by receiving and incorporating control signals from the output device. Consequently, synchronization between the two clock rate domains also incorporates control of the formatted output signals to the output device, and hence, incorporates synchronization of both control and data transfer to the output device.

An exemplary embodiment of a video decoder employing the present invention is shown in FIG. 3. FIG. 3 includes a video decoder 312, FIFO synchronizing interface 313, and output display device 314. A video decoder 312 includes a memory controller 311 which reads stored data and provides decoded digital video data for display, a filtering section 318 for filtering the digital video data for a desired resolution of the display device 314, an optional on-screen processing section 320 to format additional video data, a blender 322 to blend the video data and additional video data together into picture display data for concurrent display, a raster formatter to format the picture display data as a video signal having frame and field format used by the display device 314, timing controller 326 which provides picture display data timing and clock signals to the logic of the video decoder 312, and set up registers 328 for use by a processor (not shown) controlling the functions of the video decoder 312 during initialization.

The video decoder 312 may operate in either of two modes: master or slave mode. In the master mode, picture display data, including video and vertical and horizontal synchronization for the picture, is simply provided to the display device 314. Timing and synchronization signals HSYNC and VSYNC are generated by the timing controller 326 directly. In the slave mode, the picture display data is provided to the display device 314 using synchronization timing signals IHSYNC and IVSYNC generated by the display device 314. Therefore, in slave mode, the video decoder 312 must synchronize the picture display data both to the output rate of 27 Mhz and also synchronize to the external synchronization information from the display device 314.

The picture display data of the video decoder 312 at 33.75 MHz is provided to the exemplary embodiment of synchronizing interface 313. In master mode, the synchronizing interface 313 receives internally generated horizontal and vertical picture synchronization information RHSYNCN and RVSYNCN for the picture display data derived from the HSYNC and VSYNC signals of the timing controller 326, and in slave mode, the synchronizing interface 313 also receives picture display data synchronization information IVSYNC and IHSYNC from the display device 314. For slave mode, a state machine of the synchronizing interface 313 synchronizes the picture display data to the data rate of the display device 314, such as a 27 MHz clock, and re-synchronizes the picture display data synchronization information to the picture display data provided to the display device 314. For master mode, the picture display data and synchronization information is simply provided together to the display device 314. As shown, all logic within the video decoder 312 operates in the 33.75 MHz domain, the display device 314 operates in the 27 MHz domain, and only the synchronizing interface 313 operates in both domains.

FIFO Logic Implementation

Figure 4:
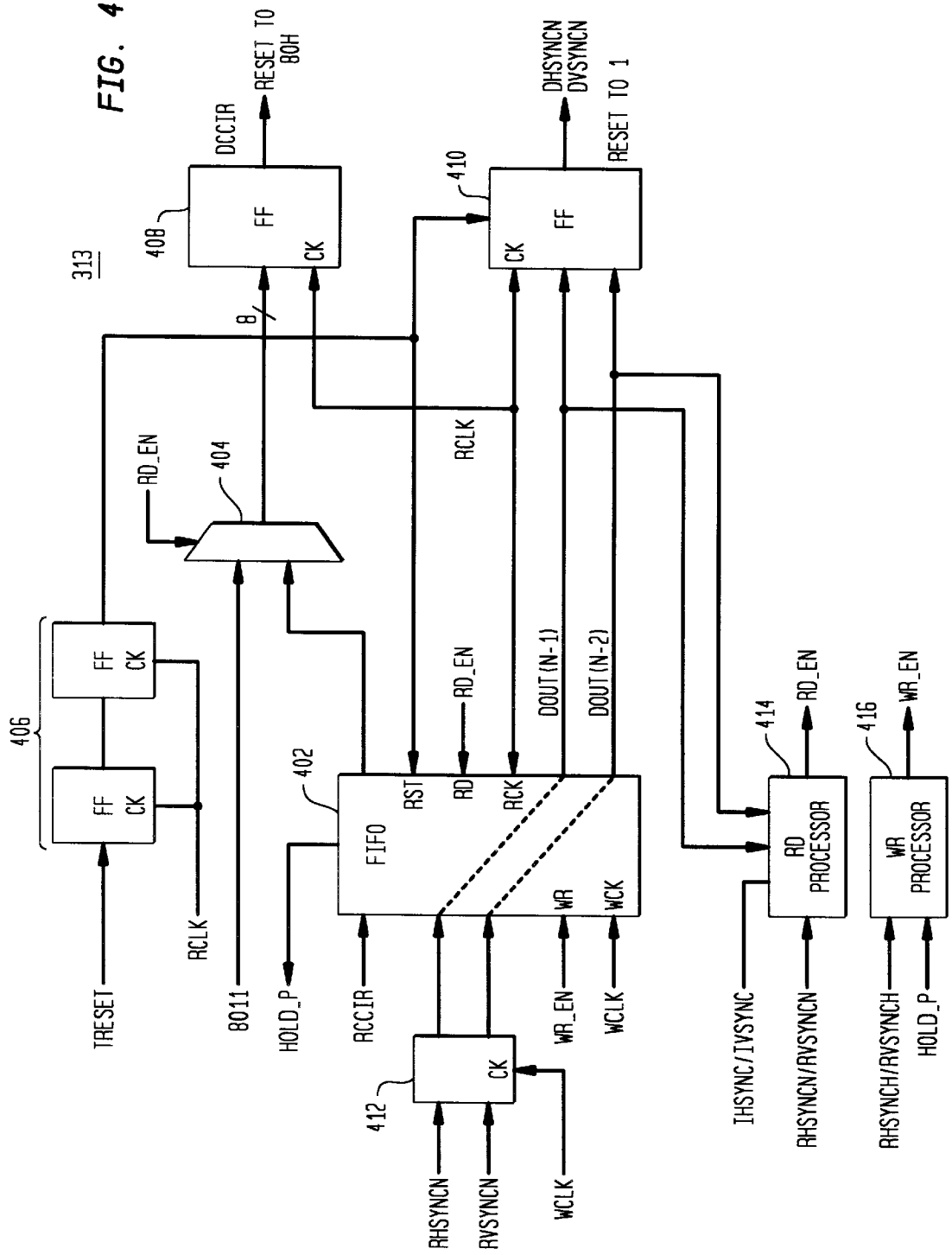
FIG. 4 is a block diagram illustrating an exemplary embodiment of a FIFO-based logic synchronization interface according to the present invention.

An illustrative logic implementation constructed in accordance with the present invention is shown schematically in FIG. 4. As seen in FIG. 4, the synchronizing interface 313 includes an asynchronous read/write first in, first out buffer (FIFO) 402, a mux 404, data flip flop (FF) 408, synch FF 410, and latching delay logic 412. The synchronizing interface also includes a write (WR) processor 416 for providing a write enable signal WR_EN to input port WR to write data into the FIFO 402 according to the internal clock WCK at 33.75 Mhz; and read (RD) processor 414 for providing a read enable signal RD_EN to input port RCK to read data from the FIFO 402 according to the external clock RCLK at 27 Mhz.

An optional synchronizing delay 406, which operates as previously described, may be included to synchronize a reset signal TRESET from a control processor operating at a different data rate than the data and synch FFs 408 and 410. In the preferred embodiment of the present invention employed in a video decoder 310 of FIG. 3, the FIFO 402 may have a size of 8×10 (8 locations, 10 bit words). For the ten-bit words, each is adapted to store eight data bits corresponding to video display data, and a vertical synchronization control bit and a horizontal synchronization control bit.

The operation of the synchronizing interface 313 is now described according to the exemplary embodiment employing video decoder 312 (FIG. 3). During the initialization phase, the read and write ports of the FIFO are disabled, and the data and sync FFs 408 and 410 are loaded with null data values for display data. In the preferred embodiment employed with a video decoder, the null data value for video data is 80H, and the horizontal and vertical synchronization pulse values are logic 1. Mux 404 passes the 80H value to the data FF 408 while the read-enable signal RN_EN is disabled.

Once the video decoder is ready to provide display data, a picture synchronization signal is generated indicating the beginning of a video frame, which may be frame 0/field 0, and line 0. The picture synchronization signal may be provided as a horizontal and vertical synchronization values RHSYNCN and RVSYNCN. In master mode, the picture synchronization signal is generated internally within the video decoder by timing controller 326 as HYSNC and VSYNC, while in slave mode the picture synchronization signal is synchronized to external frame synchronization signals IHSYNC and IVSYNC provided by the display device 313 (FIG. 3).

The presence of the RHSYNCN and RVSYNCN combination is delayed by at least one write port clock cycle by logic block 412, which may be implemented as a single flip-flop combination clocked at the 33.75 MHz rate. For master mode, the WR processor 416 enables the write ports of the FIFO 402 with the write enable signal WR_EN which is provided continuously unless interrupted by the HOLD_P signal of the FIFO 402 indicating that the FIFO 402 is full (described subsequently). Consequently, the RHSYNCN and RVSYNCN combination is provided directly to the FIFO 402. The read enable signal RD_EN is generated by the RD processor 414 according to the timing control provided by the timing controller 326 (FIG. 3).

In slave mode, once the RHSYNCN and RVSYNCN combination appears, the write ports of the FIFO 402 are enabled by the WR_EN signal provided by the WR processor 416 according to a state machine, described subsequently with reference to FIG. 5, which operates at the internal processing rate 33.75 MHz. Also in slave mode, the RD processor 414 implements a state machine, described subsequently with reference to FIG. 6, controlling the read enable signal RD_EN which operates at the external processing rate, which for the exemplary embodiment is 27 MHz.

Video data RCCIR is written to the FIFO 402 using the 33.75 Mhz clock as the write clock WCLK of FIFO 402 while no reading of data from the FIFO 402 takes place. When the FIFO 402 has received 5 bytes of data, the FIFO 402 provides a FIFO full signal, HOLD_P, which is used by WR processor 416, to disable the WR_EN signal. Once the WR_EN signal is disabled, no further data RCCIR is written to the FIFO 402. Once the data is read from the FIFO 402, HOLD_P changes state, WR_EN is enabled and more data RCCIR may be transferred to the FIFO 402.

Figure 5:
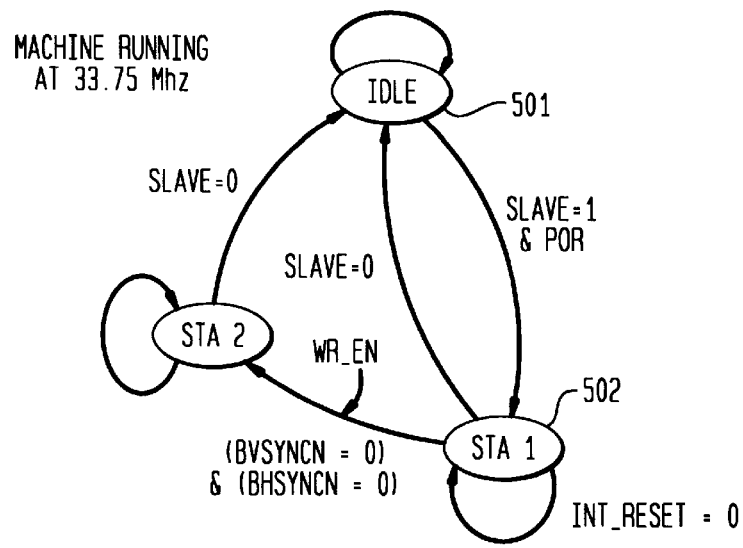
FIG. 5 shows an exemplary state machine employed by the exemplary embodiment of FIG. 4 to detect the presence of data at the input port of the FIFO and to enable the reception of data from the first logic block operating at the first rate into the buffer of the FIFO.

Referring to FIG. 5, an exemplary embodiment of the state machine employed by WR processor 416 is initially in an idle state 501, until the WR processor 416 is activated by entering slave mode (slave=1) and power-up reset (POR), upon which event the state machine moves to the wait state 502. If the chip is set to master mode (slave=0), the state machine returns to the idle state 501 because the internal processor of the video decoder will control writing of display data without the need for detection of the external horizontal and vertical synchronization signals. However, if the video decoder remains in slave mode, the state machine will remain in wait state 502.

When a RHSYNCN and RVSYNCN combination occurs, the state machine moves from the wait state 502 to the write-enable state 503, and provides the write enable signal WR_EN. The state machine remains in the write enable state 503 until the video decoder is changed to master mode (slave=0), in which case the state machine returns to the idle state 501.

Returning to FIG. 4, the RD processor 414 also detects the combination of RHSYNCN and RVSYNCN corresponding to the presence of display data horizontal and vertical synchronization pulses. When synchronization information RHSYNCN and RVSYNCN is available at the output of the FIFO 402 as $d_{out(N-1)}$ and $d_{out(N-2)}$, and the FIFO 402 contains video data RCCIR, i.e. is not empty (ef), the RD processor 414 enables reading of the FIFO 402 through a read enable signal RD_EN to transfer RCCIR and RHSYNCN and RVSYNCN values to the data and synch FFs 408 and 410 respectively. These values are latched and provided as output data DCCIR and synchronization values DHSYNCN and DVSYNCN.

In slave mode, the RD processor 414 performs an equal compare operation between the DHSYNC/DVSYNCN combination values of the data and synch FFs 408 and 410 respectively and the IHSYNC/IVSYNC combination values provided by the external display device 314. The presence of a successful equal compare event may be termed external synchronization event EXTSYN. Once the EXTSYN event occurs, reading of the data and sync FFs 408 and 410 by the external display device 314 according to the 27 Mhz clock RCLK is enabled, and synchronization between the control signals of display device 314 operating at 27 MHz and the control signals of the video decoder operating at 33.75 MHz occurs.

Figure 6:
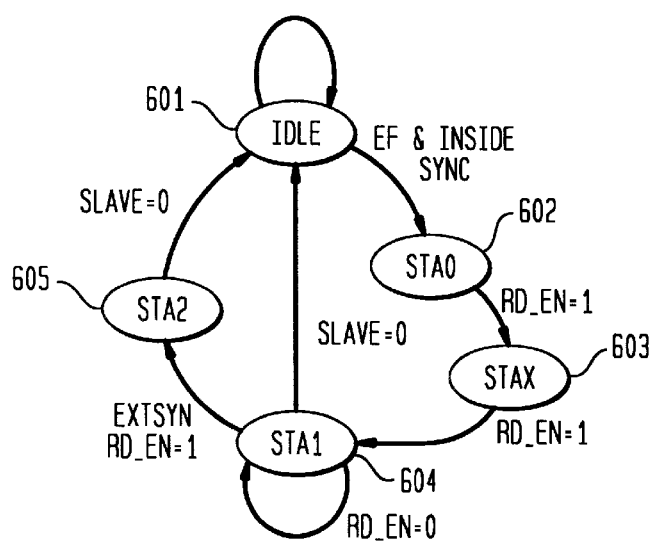
FIG. 6 shows an exemplary state machine employed by the exemplary embodiment of FIG. 4 to detect the presence of valid data and to enable the output port of the FIFO to begin providing data to a second logic block operating at a second rate.

Referring to FIG. 6, an exemplary embodiment of the state machine employed by RD processor 414 is initially in an idle state 601, until the RD processor 414 is activated by entering slave mode (slave=1) and power-up reset (POR).

If receipt of internal synchronization information (inside sync) is detected and the FIFO 402 is not empty (ef), the state machine moves to first clock wait state 602, and then to a second clock wait state 603. Upon entering each state 602 and 603, a single read enable signal RD_EN is provided (shown as RD_EN=1). The first and second clock wait states 602 and 603 are used to propagate the synchronization signals through the FIFO 402 to the output ports. For example, the RHSYNCN and RVSYNCN signal at the input of the FIFO 402 is read from the FIFO 402 during two RCLK cycles to be provided as DHSYNCN and DVSYNCN at the output of the data and synch FFs 408 and 410. After the second clock wait state 603, the read enable signal RD_EN is disabled (as shown, RD_EN=0) at state 604.

Once the external synchronization event (EXTSYN) occurs, The state machine moves to read-enabled state 605, and continues to provide the enabling RD_EN value to transfer display data RCCIR and RHSYNCN and RVSYNCN to data and sync FFs 408 and 410 respectively. The state machine remains in the read-enabled state 605 until a reset signal TRESET is received, or the video decoder is changed between master and slave modes, whereupon the state machine returns the idle state 601.

Figure 7:
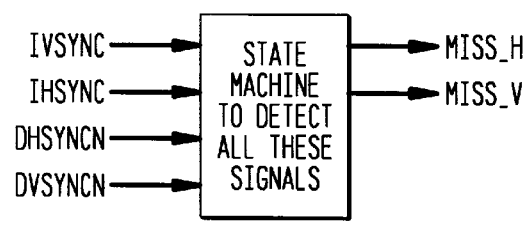
FIG. 7 is a block diagram showing a state machine to detect error conditions and for error reporting in accordance with an exemplary embodiment of the present invention.

For the video decoder in slave mode, since the output horizontal and vertical synchronizing pulses DHSYNCN and DVSYNCN are synchronized to the horizontal and vertical synchronizing pulses IHSYNC and IVSYNC received from the external display device 314, a logic block may be employed to monitor proper synchronization and timing of theses signals. An optional state machine, as shown in FIG. 7, may be used to indicate and report error conditions, such as a loss of any required signal. Once the state machine detects a synchronization signal, such as IVSYNC, IHSYNC, DHSYNCN or DVSYNCN is missing, an external processor, not shown, may disable or reset the synchronizing circuit 313. For example, the missing signal may be the horizontal or vertical synchronization (MISS_H or MISS_V). As described previously, when the display signal is not present, the data value 80H is loaded into the data FF 408, and the data value 1 loaded into the synch FF 410.

Although the foregoing detailed description has described the present invention primarily in terms of particular applications of a video encoder or decoder having internal logic operating at a first rate, but providing video data to a second logic block operating at a second rate, it should be understood that the embodiments discussed are exemplary only. Many variations may be made in the arrangements shown, including the type of first and second logic blocks used, the input and output buffers or FIFOs used. Also, the present invention is not so limited to only video applications, but may be used in any application where logic block operating in a first domain are to be separated from logic blocks operating in a second domain. These and other alternatives and variations will be readily apparent to those skilled in the art, and the present invention is therefore limited only by the appended claims.

What is claimed:

1. Apparatus for synchronizing transfer of data values between a first logic block having a first data transfer rate and a second logic block having a second data transfer rate, said data values including a sequence of values and a control value associated with said sequence, comprising:
    a first-in, first-out (FIFO) buffer adapted to receive said data values at said first data transfer rate when a write signal is present, said FIFO providing a hold signal when a predetermined number of said data values are received, and said FIFO adapted to provide said data values at said second transfer rate when a read signal is
    a processor providing, in response to a presence of said control value, said write signal when said hold signal is not present, and said read signal when said FIFO received at least one of said sequence of values,
    wherein said predetermined number of said data values define less than a video field, and
    said FIFO buffer is adapted to convert said predetermined number of said data values at the first data transfer rate to said predetermined number of said data values at the second data transfer rate, thereby synchronizing the data transfer.

2. The apparatus for synchronizing transfer of data values between said first logic block and said second logic block as recited in claim 1, wherein said processor comprises:
    write processing means for providing said write signal in response to a presence of said control value when said hold signal is not present; and
    read processing means for detecting that said FIFO received at least one of said sequence of values, and for providing said read signal in response to said detection of said at least one of said sequence and said presence of said control value.

3. The apparatus for synchronizing transfer of data values between said first logic block and said second logic block as recited in claim 2, wherein the control value is associated with an external control value, and
    said read processing means includes means for comparing said control value with said external control value to determine a matching condition, thereby to provide said read signal.

4. The apparatus for synchronizing transfer of data values between said first logic block and said second logic block as recited in claim 1, wherein said first logic block is a video decoder, said second logic block is a video display device, and said control value includes a picture synchronization value.

5. The apparatus for synchronizing transfer of data values between said first logic block and said second logic block as recited in claim 4, wherein said FIFO includes a plurality of multibit storage areas arranged in ten-bit words, each area adapted to store eight data bits corresponding to one of said sequence of values, and a vertical synchronization control bit and a horizontal synchronization control bit corresponding to said control value.

6. A method of synchronizing transfer of data values between a first logic block having a first data transfer rate and a second logic block having a second data transfer rate with a first-in, first out buffer (FIFO) between said first and second logic blocks, said data values including a sequence of values and a control value associated with said sequence, comprising the steps of:
    a) receiving said data values at said first data transfer rate into said FIFO when a write signal is present;
    b) providing, by said FIFO, a hold signal when a predetermined number of said data values defining less than a video field are received;
    c) providing, by said FIFO, said predetermined number of said data values at said second transfer rate when a read signal is present;
    d) providing said write signal in response to a presence of said control value when said hold signal is not present;
    e) detecting that said FIFO received at least one of said sequence of values; and
    f) providing said read signal in response to said detection of said at least one of said sequence and said presence of said control value.

7. Apparatus for synchronizing transfer of data values between a first logic block having a first data transfer rate and a second logic block having a second data transfer rate, said data values including a sequence of values and a control value associated with said sequence, comprising:
    a first-in, first-out (FIFO) buffer adapted to receive said data values at said first data transfer rate when a write signal is present, said FIFO providing a hold signal when a predetermined number of said data values are received, and said FIFO adapted to provide said data values at said second transfer rate when a read signal is present; and
    a processor providing, in response to a presence of said control value, said write signal when said hold signal is not present, and said read signal when said FIFO received at least one of said sequence of values, said processor including:
    write processing means for providing said write signal in response to a presence of said control value when said hold signal is not present; and
    read processing means for detecting that said FIFO received at least one of said sequence of values, and for providing said read signal in response to said detection of said at least one of said sequence and said presence of said control value;
    wherein the control value is associated with an external control value, and said read processing means includes means for comparing said control value with said external control value to determine a matching condition, thereby to provide said read signal.

8. Apparatus for synchronizing transfer of data values between a first logic block having a first data transfer rate and a second logic block having a second data transfer rate, said data values including a sequence of values and a control value associated with said sequence, comprising:

a first-in, first-out (FIFO) buffer adapted to receive said data values at said first data transfer rate when a write signal is present, said FIFO providing a hold signal when a predetermined number of said data values are received, and said FIFO adapted to provide said data values at said second transfer rate when a read signal is present; and a processor providing, in response to a presence of said control value, said write signal when said hold signal is not present, and said read signal when said FIFO received at least one of said sequence of values;

wherein said first logic block is a video decoder, said second logic block is a video display device, said sequence of values defines at least one video picture, and said control value includes a picture synchronization value for said at least one video picture, and wherein said FIFO includes a plurality of multibit storage areas arranged in ten-bit words, each area adapted to store eight data bits corresponding to one of said sequence of values, and a vertical synchronization control bit and a horizontal synchronization control bit corresponding to said control value.

* * * * *